UNITED STATES PATENT OFFICE.

NATHAN D. SMITH, OF PRAIRIE CITY, IOWA.

IMPROVEMENT IN LUBRICATING COMPOUNDS.

Specification forming part of Letters Patent No. 144,875, dated November 25, 1873; application filed October 13, 1873.

*To all whom it may concern:*

Be it known that I, NATHAN D. SMITH, of Prairie City, in the county of Jasper and State of Iowa, have invented a new Lubricating Compound, of which the following is a specification:

My invention is a semi-liquid pasty or plastic compound, designed to prevent the heat, damage, and dangers incident to axles, journals, boxes, and bearings, and all parts of machinery subject to become heated by friction. It consists in dissolving and mixing well-known lubricating substances with a liquid that does not congeal by frost, and that will at all times penetrate the pores in metal, and form a polished coating or enamel on the metal surfaces lubricated therewith and subjected to friction.

The liquid I use, and which forms the principal part of my compound, is common turpentine. To seven (7) parts of turpentine I add about two (2) parts of animal tallow and one (1) part of plumbago, (black lead.) The turpentine softens and dissolves the tallow and plumbago, so that the different ingredients are readily mixed to form a semi-liquid paste or plastic compound well adapted in consistency to be applied direct with a brush or stick, or to be put in an oil-cup that will allow it to flow gradually to the points or bearings that require it.

By applying my compound in any suitable way to a journal or journal-box, or any other metal bearings, while hot from friction, the heat is instantly or immediately reduced, and by continuing the friction the pores and rough places in the metal will become filled, and a polished enamel or coating will be formed on the surfaces which come in contact. This new and artificial surface thus formed will be as smooth and hard as glass, and as long as it remains it will prevent the parts from becoming heated by friction.

One such enamel coating will not wear off entirely in six months' constant wear, and as long as a part remains it aids in making machinery run smooth and light, and at the same time saves expense in lessening the demand for lubricating-oils.

My compound may be applied constantly through a feeding-cup, or frequently enough to prevent the necessity of using any other lubricator.

When applied occasionally only to renew the enamel coating, any common lubricating-oil can be used during the intervals to keep the parts moist, and to aid in preventing friction and heat.

The proportions of the ingredients above specified may vary to form compounds differing in consistency between a thick fluid and a stiff paste.

Substitutes for tallow and plumbago may also be used to accomplish similar results.

I claim as my invention or discovery—

The lubricating compound composed of turpentine, tallow, and plumbago, substantially as described, and for the purposes specified.

NATHAN D. SMITH.

Witnesses:
P. H. FAHY,
GEO. BROCKHAGEN.